(12) United States Patent
Zorn et al.

(10) Patent No.: US 8,765,043 B2
(45) Date of Patent: Jul. 1, 2014

(54) METHOD OF PRODUCING A FOAM MATERIAL PRODUCT

(76) Inventors: Alois Zorn, Innsbruck (AT); Florian Nowy, Innsbruck (AT)

( * ) Notice: Subject to any disclaimer, the term of this patent is extended or adjusted under 35 U.S.C. 154(b) by 1882 days.

(21) Appl. No.: 11/884,571

(22) PCT Filed: Feb. 15, 2006

(86) PCT No.: PCT/AT2006/000055
§ 371 (c)(1),
(2), (4) Date: Oct. 22, 2008

(87) PCT Pub. No.: WO2006/086813
PCT Pub. Date: Aug. 24, 2006

(65) Prior Publication Data
US 2009/0142563 A1    Jun. 4, 2009

(30) Foreign Application Priority Data

Feb. 18, 2005  (AT) ..................................... 267/2005

(51) Int. Cl.
*B29C 44/56* (2006.01)
*B29C 43/52* (2006.01)
*B29K 105/04* (2006.01)

(52) U.S. Cl.
CPC ............. B29C 44/5645 (2013.01); B29C 43/52 (2013.01); *B29K 2105/046* (2013.01)
USPC ............ 264/321; 264/345; 264/413; 264/322

(58) Field of Classification Search
USPC .............................. 264/321, 345, 413; 425/389
See application file for complete search history.

(56) References Cited

U.S. PATENT DOCUMENTS

| | | | |
|---|---|---|---|
| 2,998,501 A | | 8/1969 | Edberg et al. |
| 3,666,162 A | * | 5/1972 | Tiffin et al. ................... 229/400 |
| 4,167,612 A | * | 9/1979 | Tucker et al. ................. 521/110 |
| 5,032,622 A | * | 7/1991 | Herrington et al. ............ 521/99 |
| 5,123,985 A | * | 6/1992 | Evans et al. ................... 156/213 |
| 5,286,321 A | * | 2/1994 | Fuss .............................. 156/84 |
| 5,296,182 A | * | 3/1994 | Thary .......................... 264/46.5 |
| 5,470,521 A | * | 11/1995 | Wenzel et al. ................ 264/321 |
| 5,565,164 A | * | 10/1996 | Goehner et al. .............. 264/321 |
| 5,824,766 A | | 10/1998 | Choi et al. |
| 6,187,832 B1 | | 2/2001 | Leenslag |
| 6,358,459 B1 | * | 3/2002 | Ziegler et al. ................. 264/413 |
| 2007/0027247 A1 | | 2/2007 | Ueda et al. |

FOREIGN PATENT DOCUMENTS

| | | |
|---|---|---|
| AT | 223 377 | 9/1962 |
| DE | 18 17 590 | 10/1969 |
| DE | 74 12 131 | 7/1974 |
| DE | 90 05 464 | 8/1990 |
| DE | 90 05 465 | 8/1990 |
| EP | 0 023 553 | 2/1981 |
| EP | 1 493 763 | 1/2005 |
| EP | 1 624 024 | 2/2006 |
| GB | 884 896 | 12/1961 |
| GB | 1 185 006 | 3/1970 |
| WO | WO 02/26897 | 4/2002 |
| WO | WO 2004/099315 | 11/2004 |

* cited by examiner

*Primary Examiner* — Benjamin Schiffman
(74) *Attorney, Agent, or Firm* — Collard & Roe, P.C.

(57) ABSTRACT

The invention relates to a method of producing a foam product (1), whereby a body (2) of expanded closed-cell foam, in particular expanded polystyrene particle foam, is subjected to a non-melting heat treatment at a temperature above the glass transition temperature of the plastic used to form the foam, in particular polystyrene.

12 Claims, 4 Drawing Sheets

METHOD OF PRODUCING A FOAM MATERIAL PRODUCT

CROSS REFERENCE TO RELATED APPLICATIONS

This application is the National Stage of PCT/AT2006/000055 filed on Feb. 15, 2006, which claims priority under 35 U.S.C. §119 of Austrian Application No. A 267/2005 filed on Feb. 18, 2005. The international application under PCT article 21(2) was not published in English.

The invention relates to a foam product made from an expanded, closed-cell foam, a method of producing it and the use thereof.

Foam products made from expanded, closed-cell foams have been used in various applications for several decades. In particular, expanded polystyrene particle foam (referred to hereafter as EPF) is commercially available under various names, including expanded polystyrene hard foam or Styropor®, and is primarily used for packaging purposes or as a heat insulating material.

The known method of producing EPF is broken down into three stages:

1. Pre-Foaming

During the first stage, the raw material for EPF (polystyrene granules with pentane added as a foaming agent) is pre-foamed, primarily with the aid of steam in so-called pre-foamers at temperatures in excess of 90° C. During this process, the granulate particles swell by approximately 20 to 50 times their original volume to form round beads due to the moistening effect of the foaming agent—pentane—and also partially due to penetration by steam, and a largely closed-cell structure is formed in the bead interior. The degree of foaming, which primarily depends on the period of exposure to heat, determines the bulk density ($kg/m^3$) of the finished EPF bodies. It is preferably between 10 and 35 $kg/m^3$ and has a major influence on most of the foam properties.

2. Intermediate Storage

The pre-foamed beads are then temporarily stored in venting silos for some time, and any foaming agent and steam still present in the individual cells from the pre-foaming process condenses as the beads cool. The negative pressure which occurs as a result is compensated by diffusing air, as a result of which the stability necessary for further processing is imparted to the pre-foamed beads.

3. Final Foaming

One method that is commonly used is block foaming. To this end, the pre-foamed beads are placed in cuboid metal molds equipped with steam nozzles on all sides and exposed to steam again. The prevailing temperatures are between 110° C. and 120° C. The beads continue to foam, become plastic and slightly sticky and bond with one another ("weld") to form a homogeneous foam block due to the pressure emitted by them. After a cooling phase, these blocks are made into semi-finished products or finished products, either by sawing, hot-wire cutting or other processing methods.

The properties of EPF which can be made using known manufacturing methods, in particular good heat insulating properties, are used in many ways but it is the mechanical properties of EPF in particular which make its use in applications requiring higher strength more difficult or impossible. The relatively low strength values (compression strength, tensile strength, tensile bond strength) mean that a special fixing technique must be used if EPF is used as a construction material for building in order to transmit forces over large surface areas. When it comes to uses as a supporting component, it can be used almost exclusively only in combination with other materials of higher strength.

Various methods of improving specific properties of EPF products are known, in particular methods of changing the EPF products at their surface. In one method, for example, hot air is briefly (a few seconds) applied to the surface of EPF products, resulting in a crust-like dense surface due to melting, which reduces penetration by moisture. This heat treatment also causes a surface solidification, and the heat-treated EPF products are therefore better protected against mechanical damage than EPF products that have not been treated. With this method, the increased strength of the material is limited to the region of the melted surface. Also with this method, if the heat treatment with hot air is only slightly too long, there is a risk that the melting process will be too strong, destroying the moldings.

Various methods relating to a heat treatment for foam bodies are known from the prior art.

Specification GB 884 896 A describes a method of producing products made from polystyrene foam scraps, which are comminuted if necessary, placed under mechanical pressure and then subjected to a pressure with steam at 1 to approximately 7 atmos and a temperature of 104 to 130° C., and are bonded to form a cohesive foam body due to the resultant increase in pressure. A device used for this purpose comprises a pressing mould, in which the polystyrene foam scraps are compacted prior to applying steam, thereby reducing their volume. According to the disclosed method, this reduction in volume or increase in density takes place prior to the heat treatment with overheated steam and the polystyrene foam scraps are bonded to a cohesive foam body by blasting the scraps inside a constant volume determined by the pressing mould during the heat treatment with steam.

Patent specification EP 1 624 024 A discloses a biologically degradable polyester resin composition containing hydroxycarboxylic acid, acrylic acid ester and layered silicate and a method of producing the polyester resin composition involving a melting and kneading process. The biologically degradable polyester resin composition may be processed by foaming, injection molding, extrusion and blow molding. In one example of an embodiment 21, a foam web is produced from the polyester resin composition proposed by the invention and further processed to produce a dish for foodstuffs. In order to set a specific heat resistance, this dish is filled with water for test purposes and heated in a microwave oven for three minutes, see paragraph [92]. The temperature range recommended in paragraphs [49 to 53] is between the glass transition temperature and melting temperature of a foam product made from the polyester resin proposed by the invention and relates to the process of deep drawing and heat treating the foam material but not to a heat treatment for increasing the density of the foam material.

Patent specification EP 1 493 763 A1 discloses a plastic material for the so-called slush molding method, which is distinctive due to a high heat stability. In order to test the heat stability of example No. 4 based on one embodiment, paragraph [150] discloses a foam body made from the material proposed by the invention, which is subjected to an air drying process at 120° C. for 500 hours. A change in the volume or density of the foam product during the course of this heat treatment is not disclosed.

Patent specification U.S. Pat. No. 6,187,832 B1 discloses a method of producing a flexible polyurethane foam. In this case, a stiff polyurethane foam is produced by a reaction method which, once cured, is compacted by applying compression strain, thereby producing a more flexible polyurethane foam from the stiff polyurethane foam; the resultant flexible polyurethane foam is then subjected to a heat treatment for a period of from half a minute to eight hours at a temperature of between 70° C. and 200° C. In addition to imparting flexibility to the polyurethane foam, the latter also has an essentially constant modulus of elasticity due to the heat treatment in a temperature range of from −100° C. to +25° C. The heat treatment at least partially reverses any increase in density or reduction in volume of the foam body which might have occurred during the compaction process.

Patent specification U.S. Pat. No. 6,187,832 B1 describes a method whereby a polyamide imide foam is subjected to a heat treatment at 300° C. for a period of one hour. By heating the plastic foam, its glass transition temperature and hence also its resistance to heat is increased. A change in density or change in the volume of the polyamide imide foam due to the heat treatment is not disclosed in this specification.

The objective of the invention is to propose a foam which exhibits improved properties, in particular higher strength values.

This objective is achieved by the invention due to the fact that a body of expanded, closed-cell foam, in particular expanded polystyrene particle foam, is subjected to a non-melting heat treatment at a temperature in excess of the glass transition temperature of the plastic used to make the foam, in particular polystyrene, characterized by the fact that the volume of the foam product is reduced by the heat treatment compared with the initial state prior to the heat treatment by a value in a range with a lower limit of 50%, preferably 75%, in particular 85%, and an upper limit of 97%, preferably 96.5%, in particular 96%.

For the purpose of the method proposed by the invention, it has proved to be of advantage to modify the properties of widely and readily available starting materials by a simple method, thereby making new applications possible. It is also of particular advantage to produce differing degrees of reduction in volume using one and the same initial material on the basis of different reaction times and different temperatures during the heat treatment, thereby enabling the properties of the foam to be optimally adjusted for the respective application. By contrast with other heat treatment methods, during which changes are imparted to only the regions close to the surface, the heat treatment method proposed by the invention changes the initial material through its entire cross-section.

Although all plastics can be foamed in principle, only foams made from thermoplastic plastics are of any importance, made from polymers that are not cross-linked, in other words amorphous or part-crystalline. These polymers generally soften initially on heating and start to flow when subjected to further heat. Many thermoplastic materials have a softening range, also referred to as the glass transition range, and a melting range. On passing through the glass transition range, the amorphous elements soften and the mechanical strength of the plastics decreases. In this state, they also exhibit viscoelastic behavior to a greater or lesser degree. When thermoplastic plastics are heated to above the characteristic melting range, the crystalline structures contained in these plastics melt, resulting in pure molten material. Since the glass transition of the plastic takes place within a temperature range and not at a specific temperature, as explained above, the expression glass transition temperature in this application is intended to refer to the lower limit of the glass transition range, with effect from which the above-mentioned changes occur in the material properties, depending on the material.

Heating the initial material to above its glass transition temperature causes some of the expansion which occurred when producing the foam to be reversed because the molecule chains become more mobile at this temperature than in the initial state and the plastic making up the foam is transformed from a hard elastic state into a relatively soft elastic state. During the heat treatment process proposed by the invention, the thin walls of the cellular foam contract from their stretched state induced by expansion during manufacture and do so uniformly and across the entire cross-section, thereby resulting in the reduction in volume as proposed by the invention. Since this process is highly dependent on time, the degree of reduction in volume can easily be set on the basis of the length of time of the heat treatment. The mechanical strength of the material increases significantly during this process because the wall thickness of the cell structure increases due to shrinkage and the distance between the walls is also reduced by the shrinkage, as a result of which more walls are available per unit of surface area throughout the cross-section for transmitting and absorbing forces.

The temperature to which the body of starting material is heated and which is maintained until the end of the heat treatment is in any event above the glass transition temperature of the plastic used to make the foam but must not be set so high that the foam melts. The temperature maintained during the heat treatment also determines the maximum reduction in volume which can be achieved. At temperatures just above the glass transition temperature, only a slight reduction in volume can be achieved because only contraction strain is induced, which is compensated by the compaction of the foam caused by the reduction in volume. At temperatures significantly above the glass transition temperature of the foam, the contraction strain is generally higher overall and can only be compensated by a greater reduction in volume. If too high a temperature is selected, the process of reducing the volume is initiated so quickly at the external faces of the foam body that tears can occur at the surface because the slow introduction of heat in the foam does not cause the temperature in the body interior to rise quickly enough to initiate the reduction in volume in the body interior as well. If too hot heat sources are used, the slow introduction of heat into the body interior runs the risk of causing temperature peaks at the body surface, which can cause undesirable melting of the foam. Allowance must always be made for this aspect when choosing the method of applying heat.

If using EPF as the initial material, the method proposed by the invention may also be regarded as a type of sintering method because, in a way similar to powder metallurgy, pressed particles are solidified by a heat treatment below the melting temperature.

The heat treatment proposed by the invention may also be used with foams of different types of plastic, including in particular expanded, closed-cell foams of polyethylene (PE), poly-propylene (PP), at a temperature above the glass transition temperature of the respective plastic.

The temperature ranges specified in one embodiment have proved to be of particular advantage for the heat treatment of EPF in particular, because at these temperatures, the risk of inadvertently destroying the body due to too long reaction periods is very slight and the change in pattern takes place very uniformly across the entire cross-section.

The method may be run at ambient pressure, thereby enabling the use of equipment of simple construction in which the heat treatment can take place.

In another variant of the method, the heat treatment may also be operated at a different pressure, in which case the speed at which the reduction in volume takes place can be reduced or increased, for example by reducing the pressure in order to reduce the risk of tears forming or by increasing the pressure in order to shorten the heat treatment time. This being the case, the heat treatment takes place in a pressure-tight container which is suitable for absorbing the resultant pressure forces. The pressure is expediently set by means of a pump connected to the interior of the container and an adjustable pressure regulating unit. However, it would also be possible to generate additional pressure by providing a connection to an existing compressed air supply network.

In another advantageous variant of the method, the body is enclosed by the flexible, snug-fitting cover and the cover exerts a largely uniform pressure on the surface of the body due to the higher external ambient pressure. This enables the time needed for the heat treatment to be significantly reduced because additional compressive strain is superimposed on the internal contraction strain and the contraction process takes place more quickly at the same temperature of the heat treatment. Any folds which occur in the cover due to the reduction in volume of the body are unimportant because slight irregularities in the surface of the heat-treated body will not change its mechanical properties overall. In order to maintain the negative pressure, the interior of the cover is connected to a vacuum generator via a connecting line.

Another option for reducing the time of the heat treatment applies pressure to the body by means of a pressing plate during the heat treatment. A compression strain is superimposed on the internal contraction strain essentially along one axis in this instance, thereby making the contraction process quicker. In the most basic option, the natural weight of the pressing plate acts on the body or alternatively, this force caused by weight can be further enhanced or reduced by spring forces generated by spring-mounting the pressing plate. The properties, in particular the mechanical strength values, of the foam products are not so uniform with this type of heat treatment as they would be without this additional compression strain along one axis, but if the direction in which pressure is applied during the heat treatment is the same as that of the load during use, higher strength values can be achieved in this direction.

Heat may be transmitted to the body of expanded, closed-cell foam by convection, i.e. a fluid is circulated at an appropriate temperature. The fluid used for the heat treatment may be air, water, steam or an air-steam mixture in particular. Any other gaseous or fluid substance may also be used for the heat treatment, provided it will not have a detrimental effect on the foam due to chemical reactions, e.g. specific solvents.

A jet of heat may be also used to heat the body of expanded, closed-cell foam. The intensity of the jet should be selected so that it is just so high that it does not melt the surface of the foam.

One advantageous variant of the method is one whereby heat is transmitted to the body of expanded, closed-cell foam by high-frequency electromagnetic radiation, e.g. microwave radiation. At a typical oscillation frequency of 2.45 GHz, water molecules are excited and vibrate, thereby increasing the temperature. With this type of heat transmission, it is necessary for the foam to have at least a slight content of water, although this is achieved directly after production due to the residual moisture contained in it. The advantage of this variant of the method is that heat is not introduced from the surface into the interior and instead, heat can be introduced simultaneously and uniformly throughout the entire cross-section of the body, which is disposed in the active range of the radiation. This enables the time of the heat treatment to be shortened and the loss of energy due to heat losses during the heat treatment are reduced. Also with this variant of the method, the heat intensity introduced can be limited so that the melting temperature of the foam is not exceeded. This can expediently be achieved by repeatedly stopping the microwave radiation, thereby enabling temperature differences in the interior of the body to be compensated. In addition to the residual moisture from the production process, other substances which exhibit dipolar behavior in a high-frequency electromagnetic radiation field and thus heat up may be incorporated in the foam at the production stage, thereby enabling this type of energy to be transmitted to the body.

The change in position of the foam body during the heat treatment as defined in another embodiment is used to obtain a more uniform contraction of the foam body. The supporting and friction forces of the body due to contact with the underlying surface can inhibit the shrinkage process in the contact region with the foam body, causing non-uniform material properties. It is therefore of advantage to change the position of the foam body relative to the underlying surface at least once during the heat treatment so that another part of the body surface constitutes the contact surface with the underlying surface. This can be achieved by turning the foam body one or more times. However, it may also be achieved by mounting the foam body in a cage-type mount which is rotated about a horizontal axis, for example.

In order to reduce friction forces between the body and the underlying surface, it is of advantage to use a friction-inhibiting support. This may be provided in the form of two or more sheets lying loosely one on top of the other, for example, which slide off one another during the contraction process. Alternatively, a layer of liquid may be used, on which the body floats or which acts as a lubricant. Regions in which the liquid might penetrate the body due to capillary action can be removed before using the body. The support may also be provided in the form of rollers, in particular a plurality of spheres, by means of which the sliding friction acting between the body and underlying surface is replaced by a lower roller friction. Combinations of the above-mentioned features may also be used to reduce friction.

Another option for preventing the effect of friction and contact forces is to provide a suspended mounting for the foam body during the heat treatment.

The time of the heat treatment is advantageously selected from a range with a lower limit of 1 h, preferably 12 h, in particular 24 h, and an upper limit of 168 h, preferably 72 h, in particular 48 h, and it has proved to be of advantage to opt for shorter heat treatment times for foam bodies with a smaller volume and longer heat treatment times for bodies of larger volume. These long heat treatment times make it easy to monitor the degree of reduction in volume during the course of processing by determining the dimensions of the foam body. This can be done by taking simple length measurements by hand or by providing automatic measuring devices in the heat treatment chamber, e.g. optical measuring systems which cause the heat treatment process to stop when the foam body drops below a pre-set height—and thus reaches a specific reduction in volume.

The foam product proposed by the invention is a heat-treated, expanded, closed-cell foam, in particular expanded polystyrene particle foam, characterized by the fact that a specific degree of reduction in volume is achieved by the heat treatment. Using the method described above, the volume of the foam product can be reduced, compared with the initial state prior to the heat treatment, by a value selected from a range between a lower limit of 50% and an upper limit of 97%. This corresponds to an increase in density by a factor of between twice and 33 times the density of the initial state prior to the heat treatment.

The density of the foam product obtained due to the heat treatment defined in another embodiment also causes the properties of the foam product, such as strength values or heat conductivity, to lie within other ranges.

Due to the significantly increased strength values of the foam product after the heat treatment compared with the initial state, the foam product can advantageously be used as a construction material for applications for which an untreated foam would have strength properties that are too low and for which other, more expensive materials have had to be used in the past, such as foamed glass. Compared with foamed glass, which is very brittle, the foam product has good elasticity and toughness, which means that the risk of breakage during processing and deformation and impact stress which can occur during application is relatively low. The heat conductivity of the foam product for a density of 750 kg/m³ is approximately 0.1 W/mK, and the foam product therefore lends itself in particular to uses for producing insulating elements for construction purposes, especially in heat engineering for uncoupling supporting components from supported components. However, it could also be used in all other technical applications, e.g. the automotive industry or consumer goods industry.

Due to the further reduced capacity to absorb water compared with the initial product, the foam product can also be used to manufacture objects for imparting buoyancy in fluids. The density range of the foam products largely overlaps in broad ranges with the density range of wood products, but the foam product is not at risk of decomposition due to the effect of moisture.

To provide a clearer understanding of the foam product proposed by the invention, the features of the manufacturing process, specific properties and use of a special embodiment of the foam product will be described with reference to the appended drawings.

Of these.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 1:
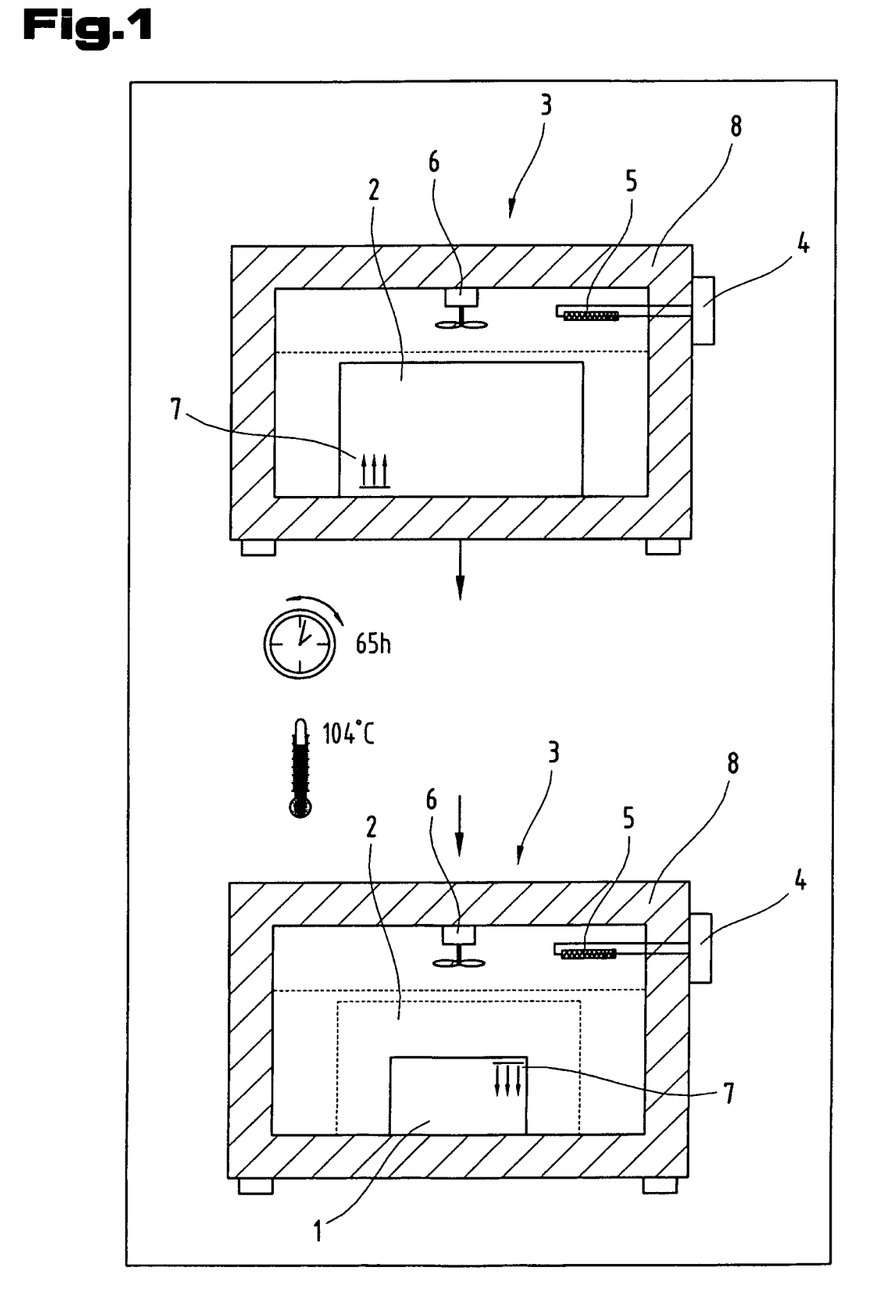
FIG. 1 is a schematic diagram of the method of manufacturing the foam product proposed by the invention.

FIG. 1 is a schematic diagram showing the method of producing the foam product 1 proposed by the invention with the specific properties described below, imparted by heat treating a body 2 of expanded, closed-cell foam. In this example, the body 2 is a cube of expanded polystyrene (EPF) with a density of 30 kg/m³. Its dimensions are 70 cm×50 cm×50 cm and its weight, which remains unchanged by the heat treatment, is 5.25 kg. Due to fluctuations in the parameters used to produce the initial material, fluctuations in the properties between different batches, in particular the density, but also the strength values. For example, the strength of the EPF can be reduced by a poorer bonding of the pre-foamed particles during the final foaming process. Any shortcomings in the quality of the initial material will not be discussed in more detail at this point, however.

In order to run the heat treatment, the body 2 of EPF is placed in an oven 3 with a temperature control unit 4 for activating a heating element 5 and air circulating unit 6. In order to initiate a reduction in the volume of the body 2 of EPF slowly and uniformly and due to the slow heat transmission inside the body 2, the temperature in the oven 3 and hence also in the body 2 is slowly increased to the heat treatment temperature. In order to reduce the time needed for the method, it has been found to be of advantage if the oven is pre-heated to approximately 80° C. (start of the glass transition range) to start the heat treatment, after which the temperature is increased to the required value. The temperature in the oven 3 is maintained as uniformly as possible at a value of 104° C. by the temperature control unit 4 during the heat treatment. Fluctuations in temperature which lie within the control accuracy of standard temperature control systems have an effect only insofar as the reduction in volume is accelerated by higher temperatures and a higher contraction overall is achieved, whereas lower temperatures slow down the reduction in volume and a lower contraction overall is achieved. By raising the temperature of the body 2 to above the glass transition temperature of polystyrene, which lies in a range between 80° C. and 90° C., internal stresses which were frozen in the EPF, as it were, due to cooling below the glass transition temperature during manufacture, start to ease due to a slow and uniform contraction of the foam structure. The walls and membranes forming the cellular structure of the foam become shorter as a result, whilst their thickness increases due to the constancy of the volume. The diameter of the expanded and mutually welded particles decreases accordingly, as a result of which the body 2 undergoes a reduction in volume overall.

In order to reduce the effect of contact forces on the contraction process, the body 2 is turned several times at intervals of 6 h respectively during the heat treatment, as a result of which the reduction in volume can take place more uniformly in the body 2 as a whole. This turning process can be seen in FIG. 1 from the changed position of a marker 7.

After a heat treatment time of 65 h, the foam product 1 produced from the body 2 of expanded polystyrene is removed from the oven 3, at which point it has a density of 230 kg/m³ calculated from the dimensions and accordingly has undergone a reduction in volume of approximately 87% compared with the initial volume. At this point, the reduction in volume which can be achieved by setting a temperature of 104° C. is largely complete. This is justifiable amongst other things because an equilibrium is reached between the easing contraction strain caused by the reduction in volume and the increased strength of the foam structure. A further reduction in volume from this state can only take place by another heat treatment after increasing the temperature in the oven 3. Due to a higher temperature, the proportion of macromolecules which have a tendency to want to revert from the stretched position caused by the expansion process to the position prior to expansion by contracting—after polymerization—increases, resulting in higher contraction strain which will not be compensated again until after a further contraction and hence compaction takes place.

However, if the selected temperature is too high, this proportion will be too high, the cell structure will collapse and the contraction process will switch to a melting process. The foam particles welded to one another to form the body 2 of EPF exhibit a sort of shape memory effect during the heat treatment, whereby they have a tendency to return to the shape of the granulate prior to expansion.

As mentioned above, the method may also be influenced by varying the temperature at which the heat treatment is conduct. The properties of the foam products 1 essentially depend on the initial material, the temperature of the heat treatment and the duration of the heat treatment, and a specific result is achieved simply by varying the heat treatment time and/or the temperature.

Due to fluctuations in the initial material, the time needed and the temperature needed for the heat treatment in order to achieve a specific reduction in volume may likewise be subject to fluctuations, but by taking repeated measurements of the dimensions of the foam product 1, the reduction in volume achieved up to the measurement time can easily be calculated and the heat treatment interrupted once the desired target value has been reached. Due to cooling, which takes placed from the outside towards the inside, the contraction in the volume of the body 2 is terminated again once there is a drop below the glass transition temperature.

In order to run the method economically and keep energy consumption for heat treating the body 2 of expanded foam low, the oven 3 used is equipped with a heat insulating layer 8. Good heat insulation or making use of the heat losses which occur from the oven 3 in some other way make the method more economical.

The table below sets out the significantly changed properties of the described foam product (Product A) proposed by the invention and another embodiment (Product B) as a result of the method, compared with the initial state.

TABLE

| properties untreated EPF, product A and product B | | | |
|---|---|---|---|
| Characteristic Unit | EPF-untreated | Product A | Product B |
| Heat treatment Duration h | — | 65 | 38 |
| Heat treatment temperature ° C. | — | 104 | 105 |
| Density kg/m$^3$ | 30 | 230 | 475 |
| Heat conductivity W/mK (ASTM F433) | 0.033 | 0.046 | 0.064 |
| Compression strength kPa (EN 826) | 250 (at 10% compression) | 3800 (at 3% compression) | 10800 (at 3% compression) |
| Max. compression due to creep at 50% d. compressive strength | — | 0.00818 | 0.00171 |
| Tensile strength kPa | 480 | 1490 | 4200 |
| Tensile bond strength kPa | 490 | 3150 | 8450 |

As may be seen from the table, a slight change in the temperature of the heat treatment has a marked effect on the speed of the reduction in volume. The only slightly higher temperature of the heat treatment used to produce product B resulted in a higher density and higher mechanical strength values in a significantly shorter time.

Figure 2:
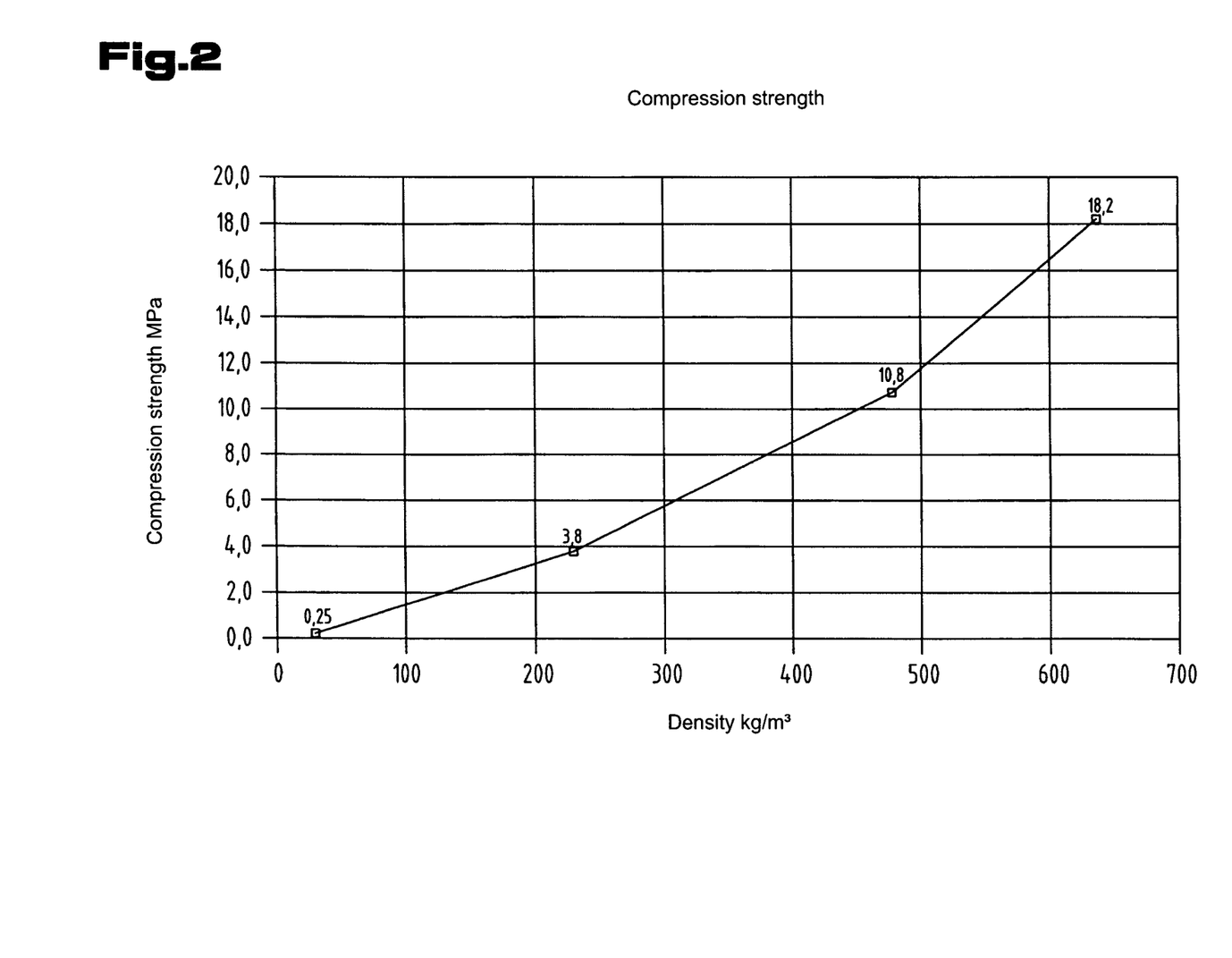
FIG. 2 shows the correlation between the compression strength and bulk density of the foam product proposed by the invention.
Figure 3:
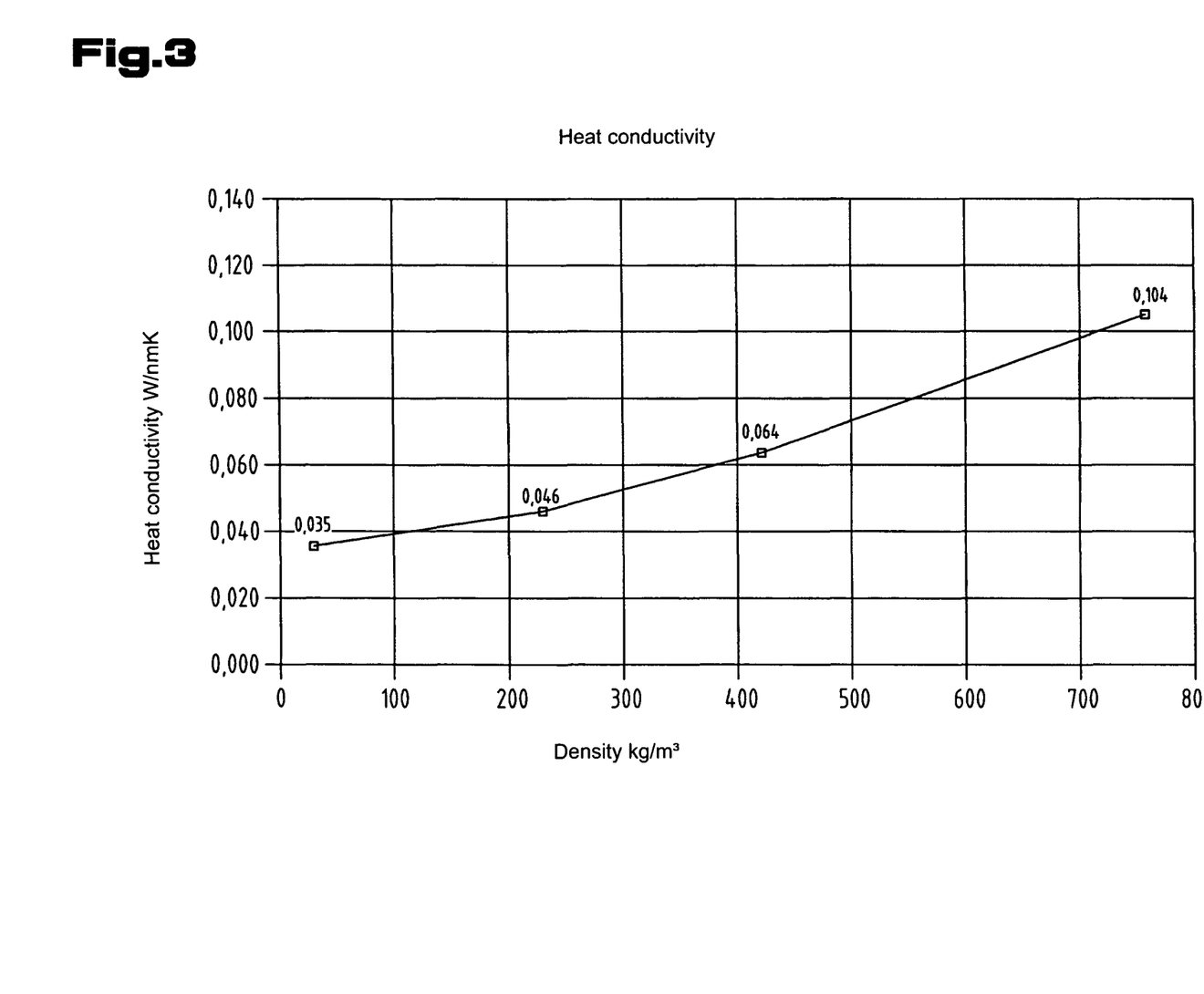
FIG. 3 shows the correlation between the heat conductivity and bulk density of the foam product proposed by the invention.

The mechanical strength of the foam product 1 proposed by the invention can be increased even further by a bigger reduction in volume and hence an accompanying increase in density, as illustrated in FIG. 2 showing an example of the compression strength. At the same time, as may be seen from FIG. 3, the heat conductivity of the foam product 1 increases as the density increases.

The cuboid foam product 1 is further processed using known methods of processing plastics, in particular cutting, sawing and milling, to make usable products, in particular panel material. The method can be used on initial bodies of any shape, although allowance must be made for the fact that in the case of bodies 2 which have both thick and thin wall thicknesses, the reduction in volume in the thin-walled regions will start earlier due to faster heating, in which case the temperature should be increased particularly slowly at the start of the heat treatment. Due to the uniform reduction in volume, the shape of the foam product 1 largely corresponds to the initial shape, other than the size. If the foam product 1 is needed in a panel shape, it is of advantage to use a panel-shaped body 2 of EPF, in which case the heat treatment is shorter and shaping after the heat treatment is made easier.

The increased mechanical strength values with a simultaneously lower heat conductivity make it possible to use the described foam product 1 as a heat insulating layer for flat roofs subjected to pressure due to walking, for example, or as a supporting heat insulating element to prevent heat bridges at the base of buildings. The foam product 1 can also be used in heat technology applications to uncouple supporting components from supported components, for example between struts and roofs.

Figure 4:
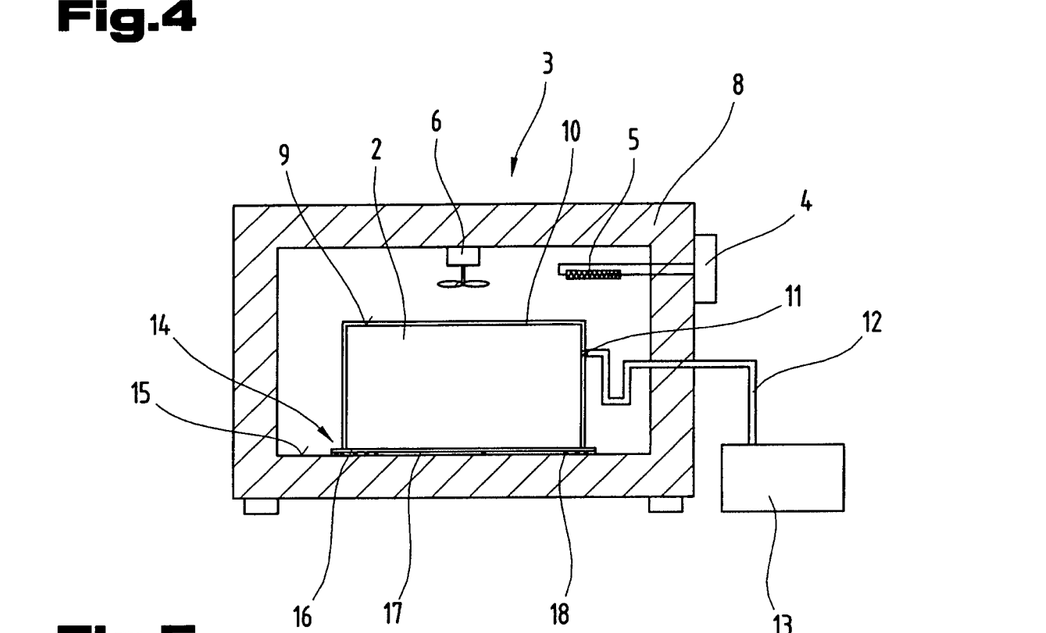
FIG. 4 is a simplified, schematic diagram showing another embodiment of the method.

FIG. 4 illustrates another embodiment of the method with special features for applying pressure to the body 2 and for reducing friction between the body 2 and underlying surface.

In order to reduce the duration of the heat treatment in this instance, a largely uniform pressure is applied to the surface 9 of the body 2 during the heat treatment for at least some of the duration, which is superimposed on the contraction strain in the cell walls of the foam particles and thus accelerates the contraction process. To this end, the body 2 is completely enclosed in a flexible cover 10, inside which a pressure below the ambient pressure outside the cover 10 prevails. To this end, the interior of the cover 10 is connected via a connector piece 11 and a connecting line 12 to any vacuum generator 13, by means of which an absolute pressure of between 0.2 bar and ambient pressure, but in particular a negative pressure of 0.4 bar to 0.8 bar can be set and maintained inside the cover 10.

FIG. 4 also illustrates an intermediate layer 14 disposed between the body 2 and an underlying surface 15 in order to reduce the effects of friction during the contraction process. In the embodiment illustrated as an example, this intermediate layer 14 comprises two layers, and the top layer 16 is made from a thin, flexible metal sheet, whilst the bottom layer 17 is made from a smooth paper sheet. As the body 2 contracts, the top layer 16 slides on the bottom layer 17 and is pushed together by the contracting body. The intermediate layer 14 may also be provided partially or totally as a layer of fluid, which forms a lubricating film between the body 2 and underlying surface 15. The intermediate layer 15 may also contain rollers 18, as indicated in FIG. 4, which reduce the friction between the body 2 and underlying surface 15. The reduced frictional forces achieved by these features no longer have a detrimental effect on the contraction process and the finished foam product 1 has more uniform properties across its height.

Figure 5:
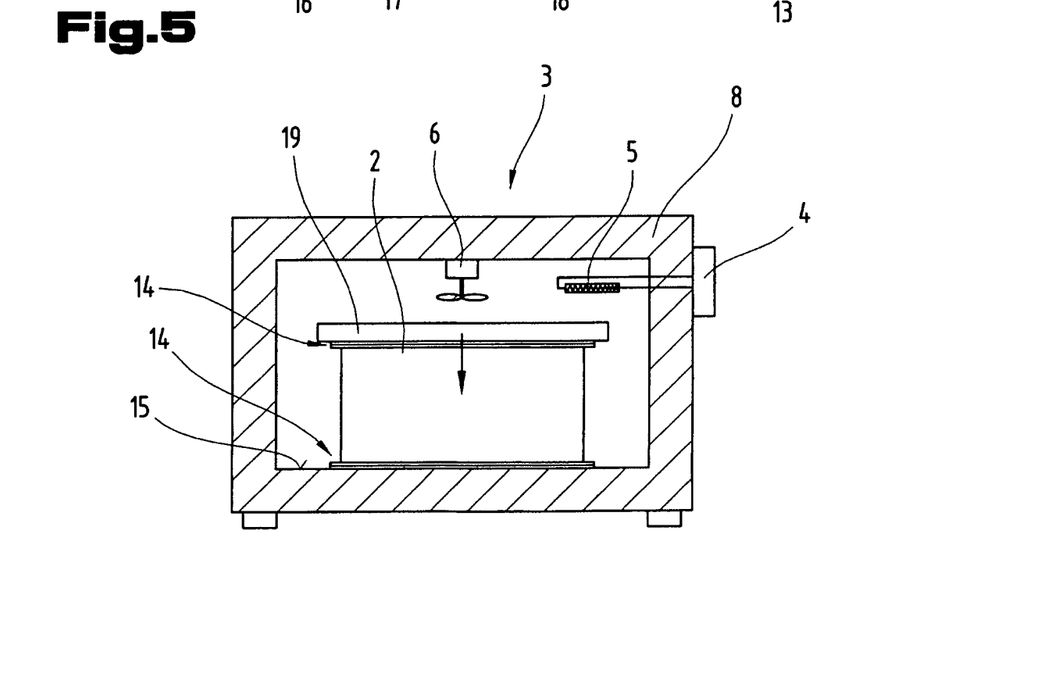
FIG. 5 is a simplified, schematic diagram showing another embodiment of the method.

FIG. 5 illustrates another way of running the method, whereby pressure is applied to the body 2 during the heat treatment by means of a pressing plate 19 which lies on the top face of a cuboid body 2. Due to the weight of the pressing plate 19, a compression strain essentially along one axis is superimposed on the internal contraction strain during the heat treatment, as a result of which the contraction process proceeds more rapidly. In the example illustrated, the natural weight of the pressing plate 19 acts on the body 2, but as an alternative, this weight could be further increased or reduced by spring forces of a spring-mounting for the pressing plate.

Again with this variant of the heat treatment, the effect of frictional forces on the contraction process can be reduced by using intermediate layers 14, between the body 2 and underlying surface 15 on the one hand and/or the body 2 and pressing plate 19.

Apart from being used as a construction material as described above, the foam product 1 proposed by the invention may also be used in all other applications which require a combination of good heat insulating properties and low density where high mechanical strength is also an advantage.

| List of reference numbers | |
|---|---|
| 1 | Foam product |
| 2 | Body |
| 3 | Oven |
| 4 | Temperature control unit |
| 5 | Heating element |
| 6 | Air circulating unit |
| 7 | Marker |
| 8 | Heat insulating layer |
| 9 | Surface |
| 10 | Cover |
| 11 | Connector piece |
| 12 | Connecting line |
| 13 | Vacuum generator |
| 14 | Intermediate layer |
| 15 | Underlying surface |
| 16 | Layer |
| 17 | Layer |
| 18 | Roller |
| 19 | Pressing plate |

The invention claimed is:

1. A method of producing a foam product, whereby a body of expanded closed-cell foam, the expanded closed-cell foam being expanded polystyrene particle foam, is subjected to a non-melting heat treatment at a temperature above the glass transition temperature of plastic used to form the expanded closed-cell foam,
   wherein the temperature during the non-melting heat treatment is selected from a range with a lower limit of 90° C. and an upper limit of 120° C., and
   wherein a volume of the foam product is uniformly reduced by the non-melting heat treatment compared with an initial state of the body prior to the non-melting heat treatment by a value from a range with a lower limit of 50% and an upper limit of 97%.

2. The method according to claim 1, wherein the non-melting heat treatment takes place at ambient pressure.

3. The method according to claim 1, wherein the non-melting heat treatment takes place at an absolute pressure between a lower limit of 0.8 bar and an upper limit of 8.0 bar.

4. The method according to claim 1, wherein the body is enclosed in a largely pressure-tight, flexible cover at least during a part of the heat treatment, the largely pressure-tight, flexible cover being a metal sheet or a plastic membrane, and wherein an absolute pressure prevailing inside the largely pressure-tight, flexible cover is selected from a range with a lower limit of 0.2 bar and an upper limit which corresponds to the ambient pressure outside the largely pressure-tight, flexible cover.

5. The method according to claim 1, wherein the non-melting heat treatment is performed in an oven having an oven surface, and
   wherein the body is subjected to a state of compression strain at least during a part of the non-melting heat treatment, the subjection of the body to a state of compression occurring via a pressing plate acting between the oven surface and a surface of the body, the oven surface underlying the surface of the body.

6. The method according to claim 1, wherein the non-melting heat treatment takes place in a fluid and the fluid is selected from the group comprising air, water, steam and an air-steam mixture.

7. The method according to claim 1, wherein heat is transmitted to the body of expanded closed-cell foam by heat radiation.

8. The method according to claim 1, wherein the expanded, closed-cell foam contains elements distributed largely uniformly throughout the volume, the elements heated under the effect of high-frequency electromagnetic radiation, and
   wherein heat is transmitted by high-frequency electromagnetic radiation to the body of expanded closed-cell foam.

9. The method according to claim 1, wherein the non-melting heat treatment is performed in an oven having an oven surface,
   wherein a position of the body of expanded closed-cell foam is changed relative to the oven surface at least once during the non-melting heat treatment so that a different part of a surface of the body constitutes a contact surface of the body with the oven surface, and
   wherein the oven surface underlies the contact surface.

10. The method according to claim 1, wherein the non-melting heat treatment is performed in an oven having an oven surface,
    wherein the oven surface underlies a contact surface of the body,
    wherein the body is placed on a friction-inhibiting intermediate layer during the non-melting heat treatment, the friction-inhibiting intermediate layer comprising:
    one or more sheets, the one or more sheets being able to slide relative to the underlying surface or relative to one another,
    a layer of fluid,
    rollers, or
    a combination of at least two of the layer of fluid, the rollers, and the one or more sheets.

11. The method according to claim 1, wherein the body of expanded closed-cell foam is suspended from a surface point of said body during the non-melting heat treatment.

12. The method according to claim 1, wherein a duration of the non-melting heat treatment is selected from a range with a lower limit of 1 h and an upper limit of 168 h.

* * * * *